United States Patent
Shibata et al.

(10) Patent No.: US 8,745,623 B2
(45) Date of Patent: Jun. 3, 2014

(54) COLLABORATION OF MODULES FOR EXECUTION OF APPLICATION IN INFORMATION PROCESSING APPARATUS, INFORMATION PROCESSING METHOD, AND STORAGE MEDIUM

(75) Inventors: Koutarou Shibata, Tokyo (JP); Hideaki Furukawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 319 days.

(21) Appl. No.: 13/238,039

(22) Filed: Sep. 21, 2011

(65) Prior Publication Data

US 2012/0096464 A1    Apr. 19, 2012

(30) Foreign Application Priority Data

Oct. 14, 2010 (JP) .................................. 2010-231950

(51) Int. Cl.
*G06F 9/46* (2006.01)

(52) U.S. Cl.
USPC ........................................................ 718/100

(58) Field of Classification Search
None
See application file for complete search history.

(56) References Cited

U.S. PATENT DOCUMENTS

| | | | | |
|---|---|---|---|---|
| 5,615,400 A | * | 3/1997 | Cowsar et al. | 719/332 |
| 6,353,926 B1 | * | 3/2002 | Parthesarathy et al. | 717/170 |
| 6,557,054 B2 | * | 4/2003 | Reisman | 710/33 |
| 7,383,305 B2 | * | 6/2008 | Kelley et al. | 709/206 |
| 2005/0278651 A1 | * | 12/2005 | Coe et al. | 715/779 |
| 2009/0217244 A1 | * | 8/2009 | Bozak et al. | 717/124 |

FOREIGN PATENT DOCUMENTS

| | | |
|---|---|---|
| JP | 63-280332 | 11/1988 |
| JP | 04-294443 | 10/1992 |
| JP | 2007-304639 | 11/2007 |

OTHER PUBLICATIONS

Japanese Office Action dated Apr. 8, 2014.

* cited by examiner

*Primary Examiner* — Van Nguyen
(74) *Attorney, Agent, or Firm* — IPUSA, PLLC

(57) ABSTRACT

An information processing apparatus includes an application and functional modules configured to collaborate with each other to provide an application function of the application. Each of the functional modules operates as a requester that requests a provider function and a provider that provides the provider function requested by the requester. Each of the functional modules includes a function availability query unit that, at the requester, queries the provider about whether the requested provider function is available, a function availability response unit that, at the provider, sends a response indicating whether the requested provider function is available to the requester, and a function execution determining unit that, at the requester, controls execution of a requester function of the requester based on the response sent from the function availability response unit.

7 Claims, 7 Drawing Sheets

COLLABORATION OF MODULES FOR EXECUTION OF APPLICATION IN INFORMATION PROCESSING APPARATUS, INFORMATION PROCESSING METHOD, AND STORAGE MEDIUM

CROSS-REFERENCE TO RELATED APPLICATION

The present application is based upon and claims the benefit of priority of Japanese Patent Application No. 2010-231950, filed on Oct. 14, 2010, the entire contents of which are incorporated herein by reference.

BACKGROUND OF THE INVENTION

1. Field of the Invention

An aspect of this disclosure relates to an information processing apparatus, an information processing method, and a storage medium.

2. Description of the Related Art

In a typical software environment of an information processing apparatus, an application provides functions (application functions) to a user using multiple program modules (hereafter called functional modules) that provide basic (small or lower-level) functions. That is, an application function is implemented through the collaboration among functional modules.

In such a software environment, when the design or specification is changed, it is often necessary to change multiple functional modules that are affected by the change. Therefore, when changed (or updated) functional modules are installed (or replaced with original functional modules) in a software environment that has been released or marketed, it is necessary to manage combinations of functional modules based on their versions to prevent failure or malfunction resulting from invalid combinations of the functional modules.

For example, Japanese Laid-Open Patent Publication No. 2007-304639 discloses a technology where software configuration information on functional modules is registered in a database and an installer is generated based on the software configuration information to manage combinations of the functional modules to be installed.

With related-art technologies, however, even when one functional module is changed, it is necessary to also change other functional modules, which are to be used in combination with the changed functional module to provide an application function, according to the change made to the functional module. Also, with the technology disclosed in JP2007-304639, as the number of combinations of functional modules increases, the number of combinations registered in the software configuration information increases. This in turn makes it harder to manage the software configuration information itself and makes it difficult to maintain the consistency of the versions of the functional modules.

Thus, with the related-art technologies, software vendors (who provide functional modules) need to do complicated work in updating (or changing) and managing functional modules, and such complicated work may lead to errors.

SUMMARY OF THE INVENTION

In an aspect of this disclosure, there is provided an information processing apparatus including an application and functional modules configured to collaborate with each other to provide an application function of the application. Each of the functional modules operates as a requester that requests a provider function and a provider that provides the provider function requested by the requester. Each of the functional modules includes a function availability query unit that, at the requester, queries the provider about whether the requested provider function is available, a function availability response unit that, at the provider, sends a response indicating whether the requested provider function is available to the requester, and a function execution determining unit that, at the requester, controls execution of a requester function of the requester based on the response sent from the function availability response unit.

DESCRIPTION OF THE PREFERRED EMBODIMENTS

Preferred embodiments of the present invention are described below with reference to the accompanying drawings.

<Hardware Configuration>

Figure 1:
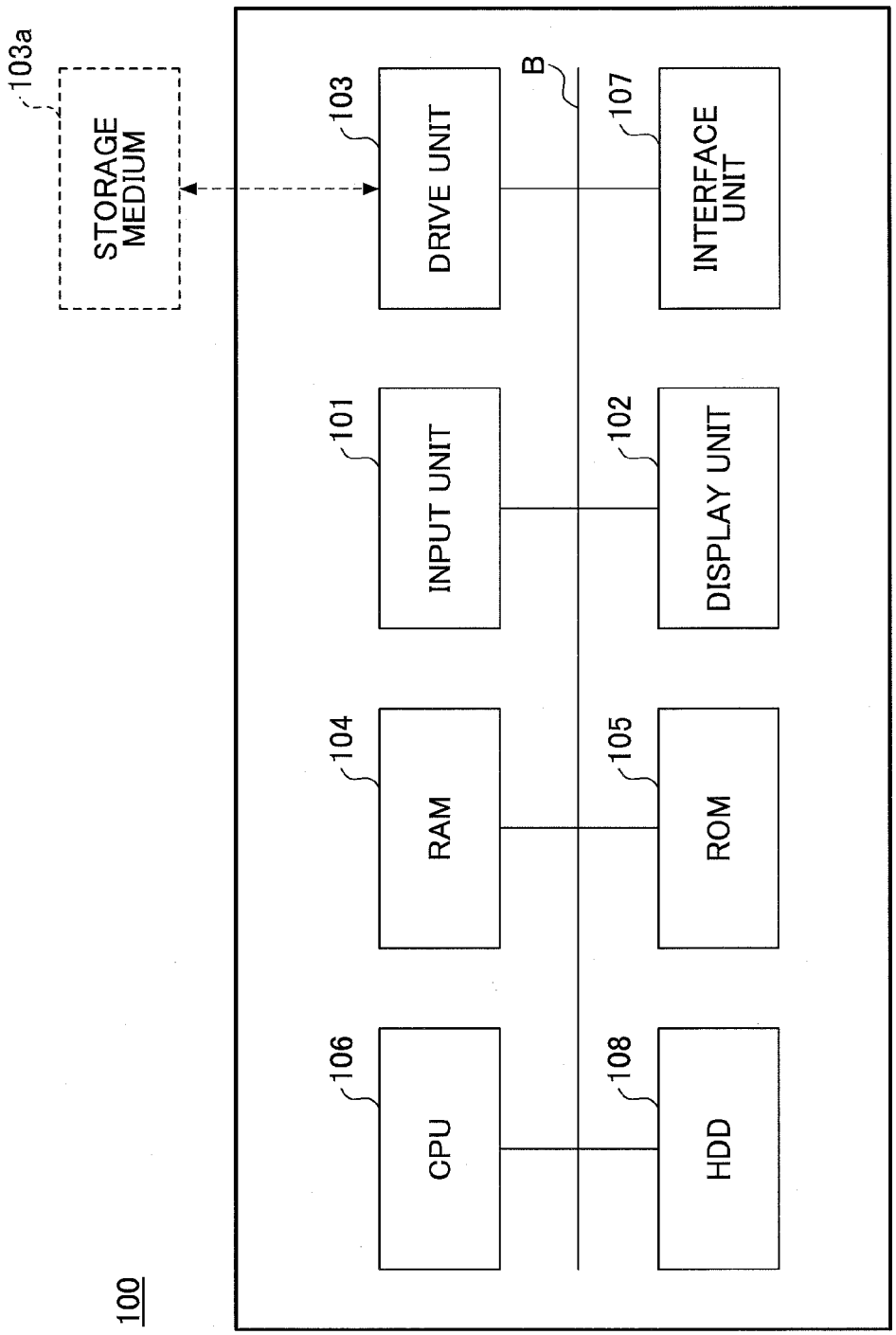
FIG. 1 is a block diagram illustrating an exemplary hardware configuration of an information processing apparatus.

FIG. 1 is a block diagram illustrating an exemplary hardware configuration of an information processing apparatus 100 of an embodiment.

As illustrated in FIG. 1, the information processing apparatus 100 includes an input unit 101, a display unit 102, a drive unit 103, a random access memory (RAM) 104, a read only memory (ROM) 105, a central processing unit (CPU) 106, an interface unit 107, and a hard disk drive (HDD) 108 that are connected to each other via a bus B.

The input unit 101 includes, for example, a keyboard and a mouse, and is used to input instructions (or operation signals) to the information processing apparatus 100. The display unit 102 displays, for example, processing results of the information processing apparatus 100.

The interface unit 107 connects the information processing apparatus 100 to a data communication channel such as a network. The information processing apparatus 100 can communicate with other apparatuses via the interface unit 107.

The HDD 108 is a non-volatile storage medium for storing various programs and data. For example, the HDD 108 stores basic software (e.g., an operating system such as Windows (trademark/registered trademark) or UNIX (trademark/registered trademark)) for controlling the entire information processing apparatus 100, and applications that run on the operating system and provide various functions (e.g., screen customization function). The HDD 108 may manage the stored programs and data using a file system and/or a database (DB).

The drive unit 103 is an interface between the information processing apparatus 100 and a removable storage medium 103a. The information processing apparatus 100 can read and write data from and to the storage medium 103a via the drive unit 103. Examples of the storage medium 103a include a floppy (flexible) disk (FD), a compact disk (CD), a digital versatile disk (DVD), a secure digital (SD) memory card, and a universal serial bus (USB) memory.

The ROM 105 is a non-volatile semiconductor memory (storage unit) that can retain data even when the power is turned off. For example, the ROM 105 stores programs and data such as a basic input/output system (BIOS) that is executed when the information processing apparatus 100 is turned on, and system and network settings of the information processing apparatus 100. The RAM 104 is a volatile semiconductor memory (storage unit) for temporarily storing programs and data. The CPU 106 loads programs and data from storage units (e.g., the HDD 108 and the ROM 105) into the RAM 104 and executes the loaded programs to control the information processing apparatus 100 and to perform various functions.

With the above hardware configuration, the information processing apparatus 100 can provide various information processing functions (or services).

<Software Configuration>

Figure 2:
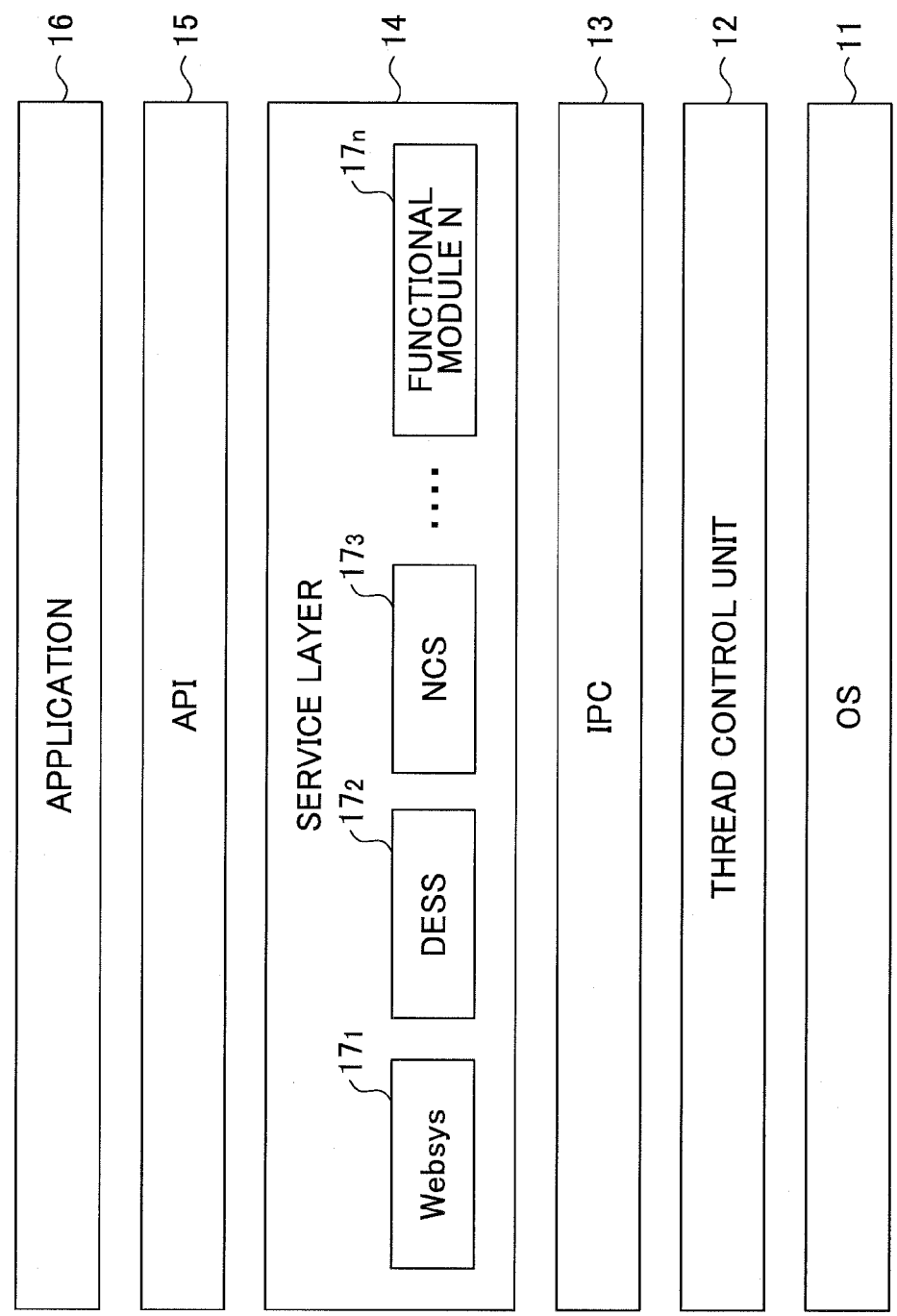
FIG. 2 is a drawing illustrating an exemplary software configuration of an information processing apparatus.

FIG. 2 is a drawing illustrating an exemplary software configuration of the information processing apparatus 100.

As illustrated in FIG. 2, the information processing apparatus 100 includes an operating system (basic software) 11, a thread control unit 12, an interprocess communication (IPC) layer 13, a service layer 14, an application programming interface (API) 15, and an application 16.

The thread control unit 12 controls threads that are units of program execution (or units of CPU utilization). Accordingly, the OS 11 supports multithreading.

The IPC layer 13 controls interprocess communications. In other words, the IPC layer 13 controls data exchange between running programs.

The service layer 14 provides the application 16 with basic functions (functional modules) for implementing application functions. In other words, the application 16 provides application functions for a user using the basic functions. More specifically, the application 16 uses the basic functions provided by the service layer 14 via the API 15.

In the example illustrated in FIG. 2, the service layer 14 includes functional modules $17_n$ (may be called the functional module 17 or the functional modules 17 when distinction is not necessary) such as a Websys $17_1$, a data encryption security service (DESS) $17_2$, and a network control service (NCS) $17_3$. The Websys $17_1$ is a functional module that implements a basic function for making various settings of the information processing apparatus 100 and for providing information on the information processing apparatus 100. The DESS $17_2$ is a functional module that implements a basic function for encrypting communications and data. The NCS $17_3$ is a functional module that implements a basic function for network control.

For example, the application 16 provides the user with an application function as described below using the Websys $17_1$, the DESS) $17_2$, and the NCS $17_3$. Here, it is assumed that the application 16 is a Web browser. The application 16 calls the API 15 to request the Websys $17_1$ to set information for encrypted communications which is input via a graphical user interface (GUI) of the application 16. The Websys $17_1$ transfers the request to the DESS $17_2$. Then, the DESS $17_2$ requests the NCS $17_3$ to set the input information for encrypted communications. The NCS $17_3$ accesses a storage area storing information items (or parameters) for encrypted communications and updates values of the corresponding information items with the input information for encrypted communications. Thus, an application function of the application 16 is provided through the collaboration of the functional modules 17 of the service layer 14.

With the above software configuration, the information processing apparatus 100 can provide various application functions.

<Information Processing Function>

An exemplary information processing function (or an execution control method) of the information processing apparatus 100 of this embodiment is described below.

In the information processing apparatus 100, the functional modules 17 collaborate with each other as described below to provide an application function. Here, for descriptive purposes, a functional module 17 that uses or requests a basic function (provider function) of another functional module 17 is called a requester functional module 17 (or simply a "requester"), and a functional module 17 that provides a basic function (provider function) to another functional module 17 is called a provider functional module 17 (or simply a "provider). The requester functional module 17 queries the provider functional module 17 about whether a requested provider function is available. When queried, the provider functional module 17 sends a response indicating whether the requested provider function is available. Based on the response, the requester functional module 17 controls execution of its basic function (requester function), i.e., determines whether to execute an original version of the requester function or an updated version of the requester function. In the information processing apparatus 100 of this embodiment, the functional modules 17 are executed or controlled as described above.

As described above, with the related-art technologies, software vendors need to do complicated work in updating and managing functional modules in an already-released software environment, and such complicated work may lead to errors.

To prevent or reduce problems with the related-art technologies, in the information processing apparatus 100 of this embodiment, the functional modules 17, which collaborate with each other to provide an application function, query each other to confirm "function support status" (e.g., whether the functional modules 17 support newly-introduced application functions).

This configuration makes it possible to easily manage combinations of the functional modules 17. That is, with the information processing apparatus 100 of this embodiment, even when one functional module 17 is changed, it is not necessary to change other functional modules 17, which collaborate with the changed functional module 17 to provide an application function, according to the change made to the changed functional module 17. Thus, this embodiment makes it possible to prevent the work of software vendors from being complicated even when the number of combinations of the functional modules 17 increases.

An exemplary functional configuration of the functional module 17 is described below.

Figure 3:
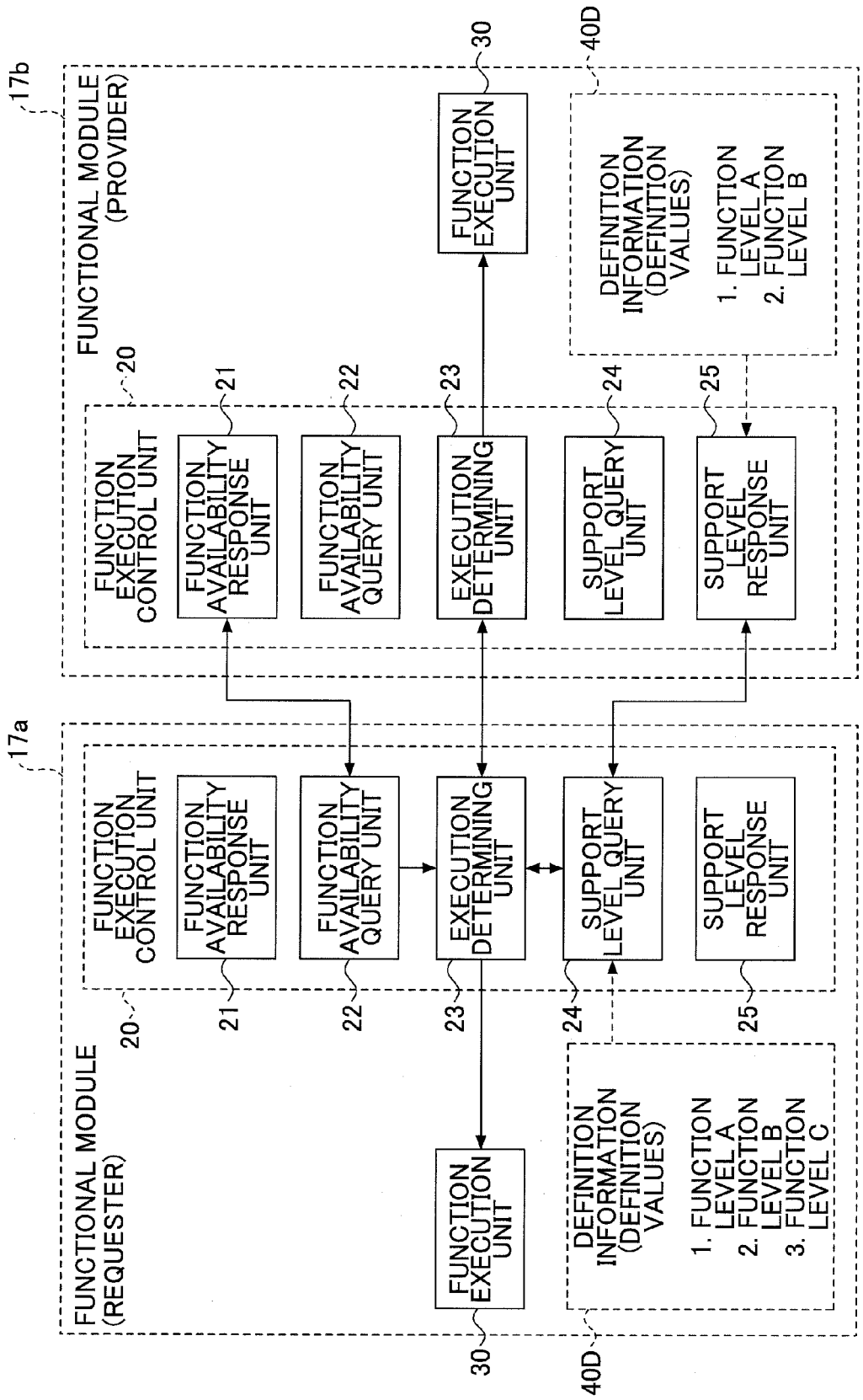
FIG. 3 is a block diagram illustrating an exemplary functional configuration of a functional module.

FIG. 3 is a block diagram illustrating an exemplary functional configuration of the functional module 17.

As illustrated in FIG. 3, the functional module 17 includes a function execution control unit 20 and a function execution unit 30.

The function execution control unit 20 is a functional unit that controls execution of the functional module 17. The function execution unit 30 is a functional unit that executes or implements the basic function of the functional module 17.

The function execution control unit 20 requests the function execution unit 30 to execute the basic function of the functional module 17.

The function execution control unit 20 includes a function availability response unit 21, a function availability query unit 22, an execution determining unit 23, a support level query unit 24, and a support level response unit 25.

In FIG. 3, it is assumed that a functional module 17a is a requester functional module that requests a basic function of another functional module and a functional module 17b is a provider functional module that provides the requested basic function.

The function availability response unit 21 is a functional unit that sends a response indicating whether a requested basic function (provider function) is available to a requester functional module. The function availability query unit 22 is a functional unit that queries a provider functional module about whether the requested provider function is available. In the example of FIG. 3, the function availability query unit 22 of the requester functional module 17a queries the provider functional module 17b about whether a requested provider function is available. When queried, the function availability response unit 21 of the provider functional module 17b sends a response indicating whether the requested provider function is available.

The function availability response unit 21 includes a software interface for receiving a query about whether a requested provider function is available (or whether the provider function supports a newly-introduced application function). The function availability query unit 22 sends a query about the availability of the requested provider function to the function availability response unit 21 via the software interface and receives a response from the functional availability response unit 21 via the software interface.

The execution determining unit 23 is a functional unit that determines, based on the response received by the function availability query unit 22, whether to execute an original version of its basic function (requester function) that is not adapted for a newly-introduced application function of the application 16 or an updated version of the basic function (requester function) that is adapted for the newly-introduced application function. For example, when the response from the provider functional module 17b indicates "error", the execution determining unit 23 of the requester functional module 17a determines that the requested provider function is unavailable, i.e., the basic function of the provider functional module 17b does not support the newly-introduced application function. Meanwhile, when the response from the provider functional module 17b indicates "available", the execution determining unit 23 of the requester functional module 17a determines that the requested provider function is available, i.e., the basic function of the provider functional module 17b supports the newly-introduced application function.

Based on the determination result, the function execution control unit 20 performs a process as described below. When the determination result is "unavailable", the function execution control unit 20 of the requester functional module 17a requests the function execution unit 30 of the same functional module 17a to execute the original version of the requester function. Meanwhile, when the determination result is "available", the function execution control unit 20 of the requester functional module 17a requests the function execution unit 30 of the same functional module 17a to execute the updated version of the requester function.

Thus, the requester functional module 17a controls execution of the requester function based on whether the requested provider function is available from the provider functional module 17b.

The support level query unit 24 is a functional unit that queries a provider functional module about function levels of the newly-introduced application function supported by the provider function. Meanwhile, the support level response unit 25 is a functional unit that sends a response indicating supported function levels of the newly-introduced application function to the requester functional module.

As described above, the requester functional module 17a determines whether a requested provider function is available, i.e., whether the provider function of the provider functional module 17b supports the newly-introduced application function, based on a response from the provider functional module 17b. Here, it is more preferable to determine function levels of the newly-introduced application function supported by the provider function to more accurately determine the compatibility between the requester functional module 17a and the provider functional module 17b taking into account the history of design or specification changes and thereby to prevent errors.

For this reason, each of the functional modules 17 of this embodiment may further include definition information 40D including definition values that are used among the functional modules 17 to indicate supported function levels of the newly-introduced application function. In the example of FIG. 3, the definition information 40D of the requester functional module 17a includes definition values "1" (level 1), "2" (level 2), and "3" (level 3) indicating that function levels A, B, and C of the newly-introduced application function are supported. Meanwhile, the definition information 40D of the provider functional module 17b includes definition values "1" (level 1) and "2" (level 2) indicating that function levels A and B of the newly-introduced application function are supported. In this case, the requester functional module 17a needs to control the execution of the requester function such that the requester function and the provider function collaborate with each other at the function levels A and B that are supported by both of the requester functional module 17a and the provider functional module 17b. For this reason, the requester functional module 17a determines the function levels of the newly-introduced application function supported by the provider function of the provider functional module 17b.

The support level query unit 24 of the requester functional module 17a queries the provider functional module 17b about the supported function levels (or the highest function level) of the newly-introduced application function. When queried, the support level response unit 25 of the provider functional module 17b refers to the definition information 40D and sends a response including the definition values indicating the supported function levels of the newly-introduced application function to the requester functional module 17a. Then, based on the response, the requester functional module 17a determines the function levels (or the highest function level) of the newly-introduced application function supported by the provider functional module 17b.

The support level response unit 25 includes a software interface for receiving a query about the supported function levels of the newly-introduced application function. The support level query unit 24 sends a query about the supported function levels of the newly-introduced application function to the support level response unit 25 via the software interface and receives a response indicating the supported function levels from the support level response unit 25 via the software interface. The support level query unit 24 operates only when the function availability query unit 22 receives a response indicating "available" from the function availability response unit 21.

Based on the response received by the support level query unit 24, the execution determining unit 23 of the requester functional module 17a determines the function levels of the newly-introduced application function that are supported by both of the requester functional module 17a and the provider functional module 17b. More specifically, the execution determining unit 23 of the requester functional module 17a determines executable function levels based on the response and the definition information 40D. For example, when the definition information 40D of the requester functional module 17a includes definition values "1" through "3" corresponding to the function levels A through C (levels 1-3) and the response from the provider functional module 17b includes definition values "1" and "2" corresponding to the function levels A and B (levels 1-2), the execution determining unit 23 of the requester functional module 17a determines that the function level B is the highest function level that is executable (the highest executable function level). As another example, when the definition information 40D of the requester functional module 17a includes definition values "1" and "2" corresponding to the function levels A and B (levels 1-2) and the response from the provider functional module 17b includes definition values "1" through "3" corresponding to the function levels A through C (levels 1-3), the execution determining unit 23 of the requester functional module 17a also determines that the function level B is the highest executable function level.

Thus, the execution determining unit 23 compares the definition values defined in a requester functional module and the definition values defined in a provider functional module (or a response) to determine the highest common definition value ("2" in the example of FIG. 3) that is the highest one of definition values defined in both of the requester and provider functional modules, and determines the highest executable function level (the function level B in the example of FIG. 3) based on the highest common definition value.

Based on the determined highest executable function level, the execution determining unit 23 of the requester functional module 17a controls the execution of the updated version of the requester function. For example, when the function level B is determined as the highest executable function level, the function execution control unit 20 of the requester functional module 17a requests the function execution unit 30 of the same functional module 17a to execute the updated version of the requester function at the function level B that supports both the function levels A and B (levels 1 and 2).

Thus, the requester functional module 17a controls execution of the requester function based on function levels of the newly-introduced application function that are supported by the provider function of the provider functional module 17b.

Exemplary processes performed between a requester functional module and a provider functional module to provide an application function are described below.

<Exemplary Process (1)>

Figure 4:
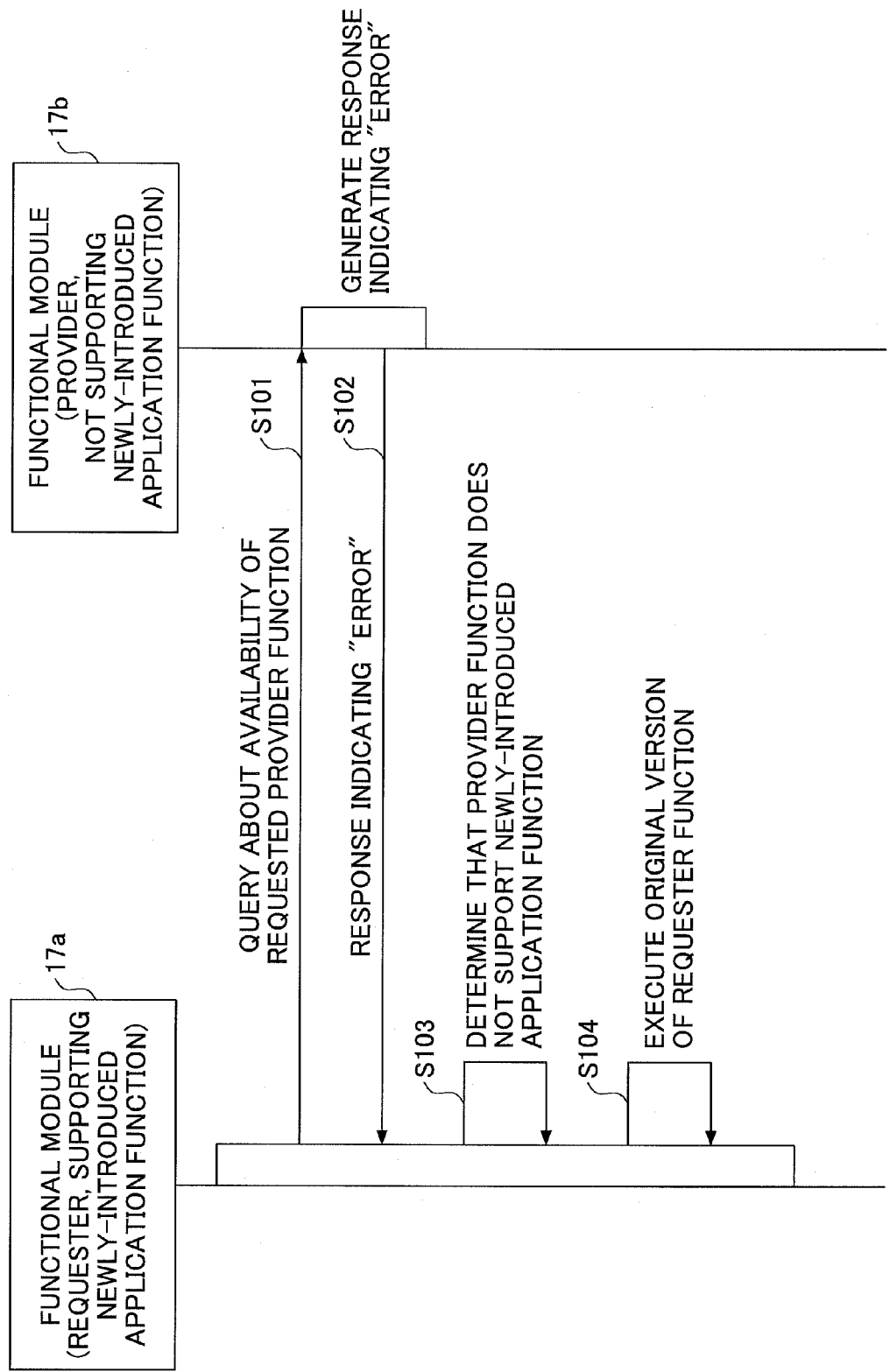
FIG. 4 is a sequence chart illustrating an exemplary process performed between functional modules.

FIG. 4 is a sequence chart illustrating an exemplary process (1) performed between the requester functional module 17a and the provider functional module 17b. In FIG. 4, it is assumed that the requester functional module 17a supports a newly-introduced application function and the provider functional module 17b does not support the newly-introduced application function.

As illustrated in FIG. 4, the function availability query unit 22 of the requester functional module 17a queries the provider functional module 17b about whether a requested provider function supporting the newly-introduced application function is available (step S101).

Since the provider function of the provider functional module 17b does not support the newly-introduced application function, the function availability response unit 21 of the provider functional module 17b sends a response indicating "error" to the requester functional module 17a (step S102).

Based on the response indicating "error", the execution determining unit 23 of the requester functional module 17a determines that the provider function does not support the newly-introduced application function (step S103).

Then, the execution determining unit 23 of the requester functional module 17a requests the function execution unit 30 of the same requester functional module 17a to execute an original version of the requester function that is not adapted for the newly-introduced application function. Then, the function execution unit 30 of the requester functional module 17a executes the original version of the requester function (step S104).

<Exemplary Process (2)>

Figure 5:
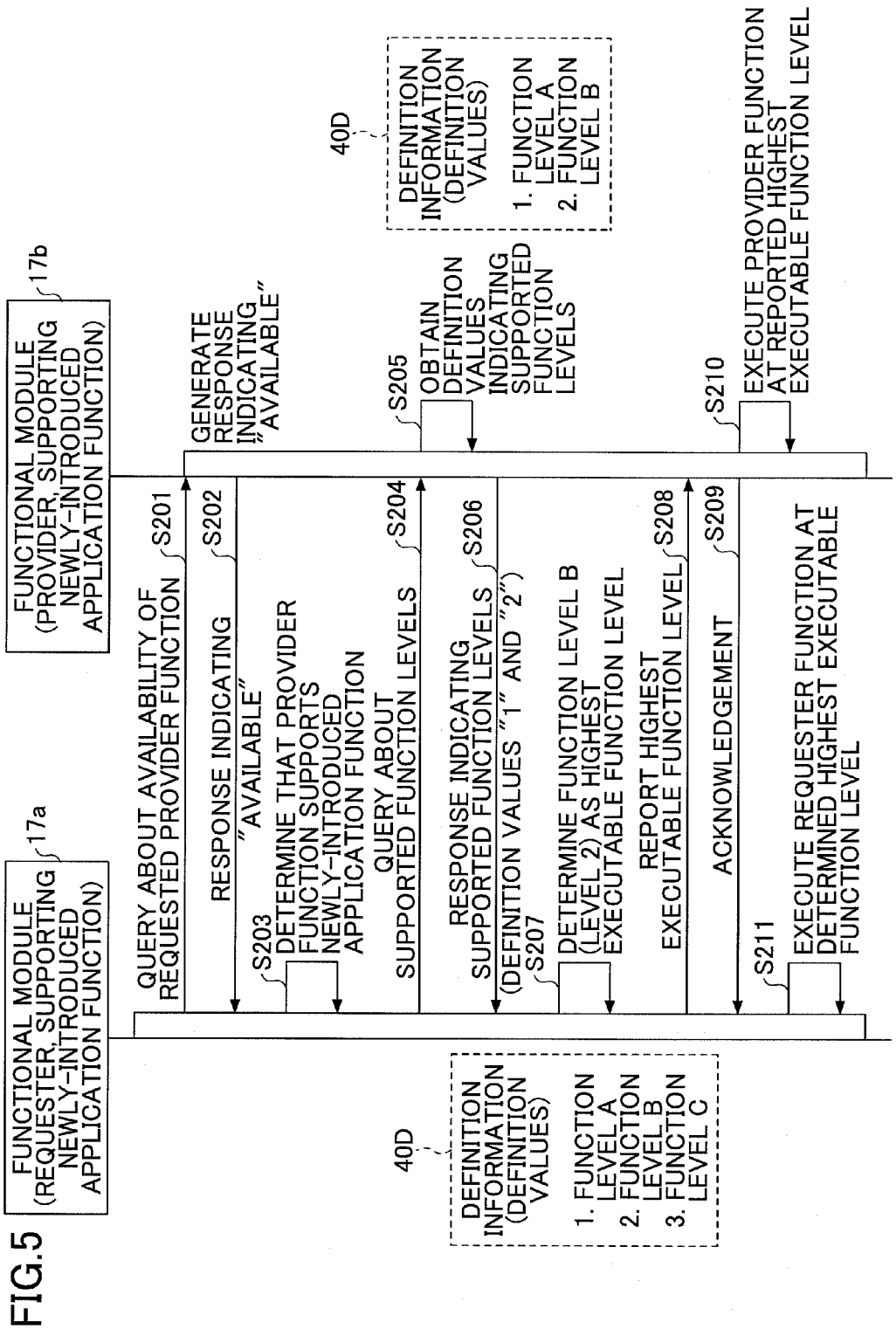
FIG. 5 is a sequence chart illustrating another exemplary process performed between functional modules.

FIG. 5 is a sequence chart illustrating an exemplary process (2) performed between the requester functional module 17a and the provider functional module 17b. In FIG. 5, it is assumed that both of the requester functional module 17a and the provider functional module 17b support the newly-introduced application function.

As illustrated in FIG. 5, the function availability query unit 22 of the requester functional module 17a queries the provider functional module 17b about whether a requested provider function supporting the newly-introduced application function is available (step S201).

Since the provider function of the provider functional module 17b supports the newly-introduced application function, the function availability response unit 21 of the provider functional module 17b sends a response indicating "available" to the requester functional module 17a (step S202).

Based on the response indicating "available", the execution determining unit 23 of the requester functional module 17a determines that the provider functional module 17b supports the newly-introduced application function (step S203).

Then, the support level query unit 24 of the requester functional module 17a queries the provider functional module 17b about supported function levels of the newly-introduced application function (step S204).

When queried, the support level response unit 25 of the provider functional module 17b refers to the definition information 40D and obtains definition values "1" and "2" indicating the function levels A and B (levels 1 and 2) of the newly-introduced application function that are supported (step S205). Next, the support level response unit 25 of the provider functional module 17b sends a response including the definition values "1" and "2" indicating the supported function levels A and B to the requester functional module 17a (step S206).

When receiving the response, the execution determining unit 23 of the requester functional module 17a compares the definition values "1" and "2" in the response and the definition values "1" (level 1), "2" (level 2), and "3" (level 3) in the definition information 40D of its own, and thereby determines that the function level B (level 2) is the highest executable function level. More specifically, the execution determining unit 23 identifies the highest common definition value ("2" in this example) based on the comparison results and thereby determines the highest executable function level (the function level B (level 2)). The execution determining unit 23 of the requester functional module 17a reports the determined highest executable function level (level 2) to the provider functional module 17b (step S208).

In response to the report, the execution determining unit 23 of the provider functional module 17b sends an acknowledgement to the requester functional module 17a (step S209) and requests the function execution unit 30 to execute the provider function at the reported highest executable function level. Then, the function execution unit 30 of the provider functional module 17b executes the provider function at the reported highest executable function level (level 2 supporting both the function levels A and B) (step S210).

When receiving the acknowledgement, the execution determining unit 23 of the requester functional module 17a requests the functional execution unit 30 of the same requester functional module 17a to execute the requester function at the determined highest executable function level (level 2). Then, the function execution unit 30 of the requester functional module 17a executes the requester function at determined highest executable function level (level 2 supporting both the function levels A and B) (step S211).

Thus, in the information processing apparatus 100 of this embodiment, the functional modules 17, which collaborate with each other to provide an application function, query each other to confirm "function support status" (e.g., whether the functional modules 17 support newly-introduced application functions).

As described above, in the information processing apparatus 100 of this embodiment, information processing functions are provided through collaboration among the above described functional units. The functional units are implemented by executing software programs installed in the information processing apparatus 100. For example, the software programs are loaded by a processing unit (e.g., the CPU 106) from storage units (e.g., the HDD 108 and/or the ROM 105) into a memory (e.g., the RAM 104) and are executed to implement the functional units of the information processing apparatus 100.

Exemplary processes performed among functional modules (or information processing functions provided by collaboration among functional modules) are described.

<Exemplary Process (3)>

Figure 6:
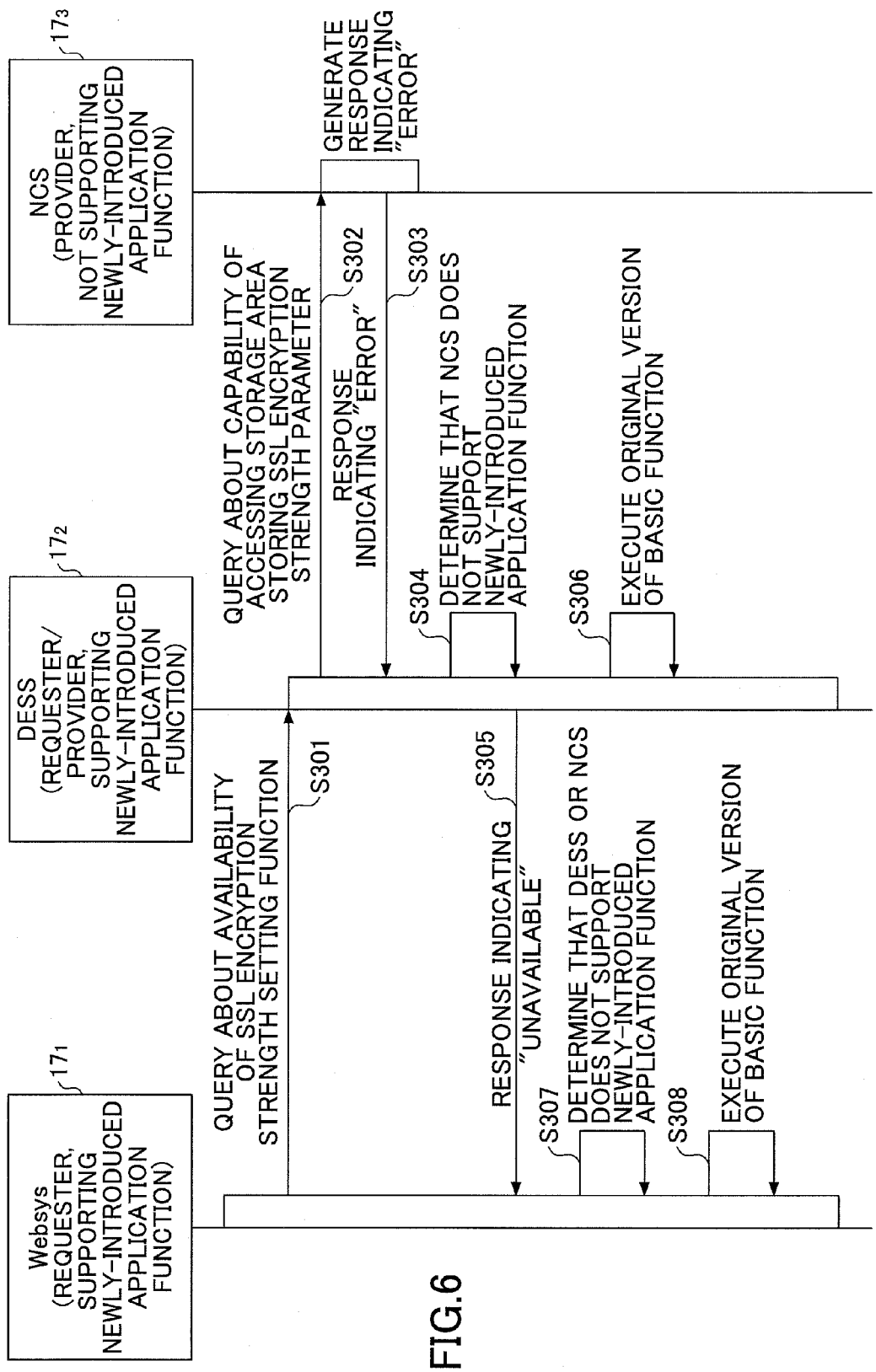
FIG. 6 is a sequence chart illustrating an exemplary process performed among functional modules.

FIG. 6 is a sequence chart illustrating an exemplary process (3) performed among the Websys 17₁, the DESS 17₂, and the NCS 17₃ of the service layer 14 illustrated in FIG. 2 to provide a Secure Socket Layer (SSL) encryption strength setting function (newly-introduced application function) of the application 16. In FIG. 6, it is assumed that the Websys 17₁ and the DESS 17₂ support the newly-introduced application function. Also in FIG. 6, the Websys 17₁ corresponds to the requester functional module 17a and DESS 17₂ corresponds to the provider functional module 17b. The DESS 17₂ collaborates with both the Websys 17₁ and the NCS 17₃ and therefore has characteristics of both the requester functional module 17a and the provider functional module 17b.

As illustrated in FIG. 6, in response to a request from the application 16, the function availability query unit 22 of the Websys 17₁ queries the DESS 17₂ about whether the SSL encryption strength setting function (newly-introduced application function) is available (step S301).

Since the DESS 17₂ supports the newly-introduced application function, the function availability query unit 22 of the DESS 17₂ queries the NCS 17₃ about whether it is capable of accessing a storage area storing an SSL encryption strength parameter (step S302).

Since the provider function of the NCS 17₃ does not support the newly-introduced application function, the function availability response unit 21 of the NCS 17₃ sends a response indicating "error" to the DESS 17₂ (step S303).

Based on the response indicating "error", the execution determining unit 23 of the DESS 17₂ determines that the NCS 17₃ does not support the newly-introduced application function (step S304). Then, the function availability response unit 21 of the DESS 17₂ sends a response indicating "unavailable" to the Websys 17₁ (step S305).

Also, the execution determining unit 23 of the DESS 17₂ requests the functional execution unit 30 to execute an original version of the basic function that is not adapted for the newly-introduced application function. In response, the function execution unit 30 of the DESS 17₂ executes the original version of the basic function that is not adapted for the newly-introduced application function (the SSL encryption strength setting function) (step S306).

Meanwhile, based on the response indicating "unavailable", the execution determining unit 23 of the Websys 17₁ determines that the DESS 17₂ or the NCS 17₃ does not support the newly-introduced application function (step S307).

Then, the execution determining unit 23 of the Websys 17₁ requests the functional execution unit 30 to execute an original version of the basic function that is not adapted for the newly-introduced application function. In response, the function execution unit 30 of the Websys 17₁ executes the original version of the basic function that is not adapted for the newly-introduced application function (the SSL encryption strength setting function) (step S308).

<Exemplary Process (4)>

Figure 7:
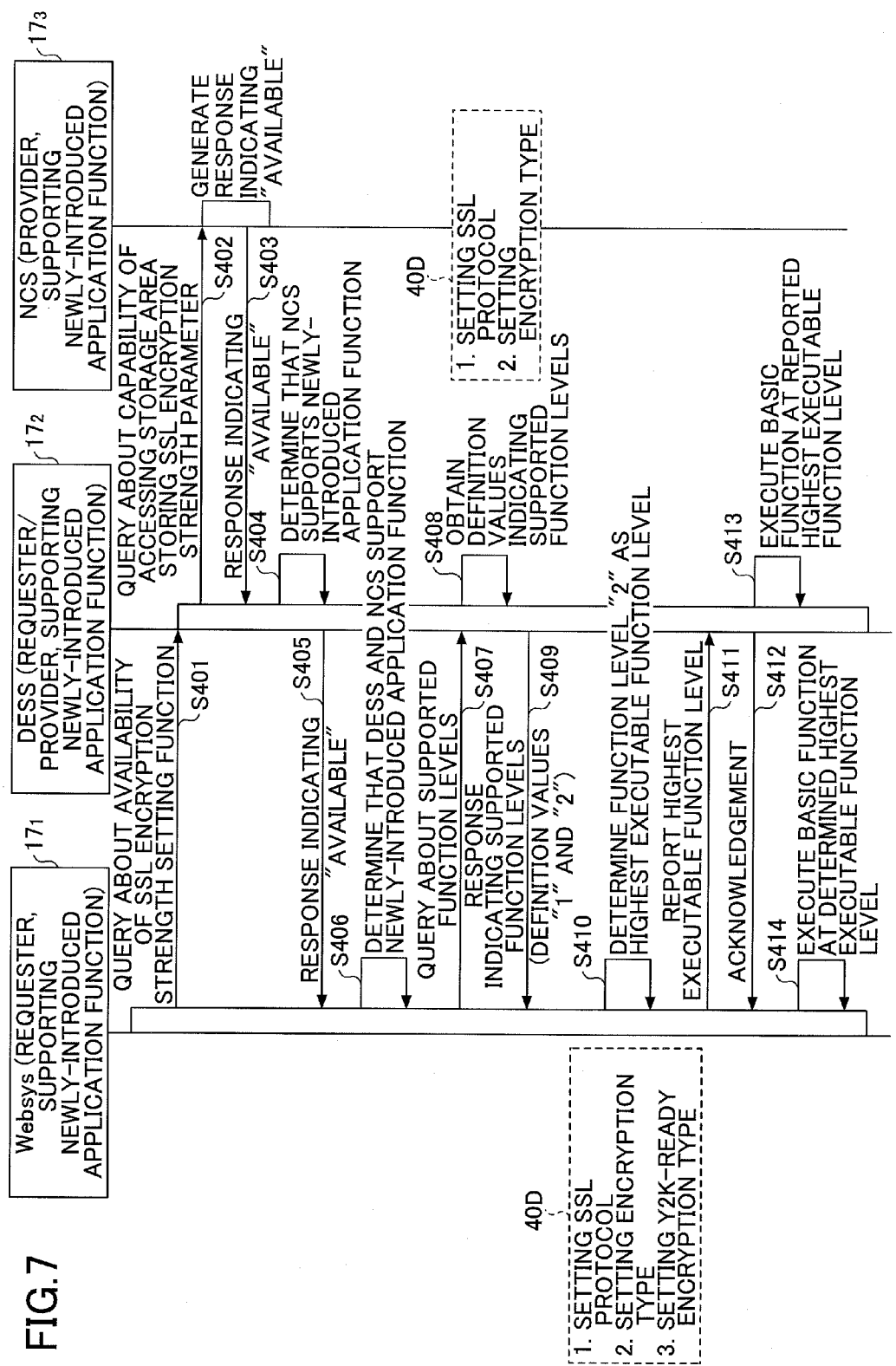
FIG. 7 is a sequence chart illustrating another exemplary process performed among functional modules.

FIG. 7 is a sequence chart illustrating an exemplary process (4) performed among the Websys 17₁, the DESS 17₂, and the NCS 17₃ to provide the SSL encryption strength setting function (newly-introduced application function) of the application 16. In FIG. 7, different from FIG. 6, it is assumed that all of the Websys 17₁, the DESS 17₂, and the NCS 17₃ support the newly-introduced application function.

As illustrated in FIG. 7, in response to a request from the application 16, the function availability query unit 22 of the Websys 17₁ queries the DESS 17₂ about whether the SSL encryption strength setting function is available (step S401).

Since the DESS 17₂ supports the newly-introduced application function, the function availability query unit 22 of the DESS 17₂ queries the NCS 17₃ about whether it is capable of accessing a storage area storing an SSL encryption strength parameter (step S402).

Since the NCS 17₃ supports the newly-introduced application function, the function availability response unit 21 of the NCS 17₃ sends a response indicating "capable" to the DESS 17₂ (step S403).

Based on the response indicating "capable", the execution determining unit 23 of the DESS 17₂ determines that the NCS 17₃ supports the newly-introduced application function (step S404). Then, the function availability response unit 21 of the DESS 17₂ sends a response indicating "available" to the Websys 17₁ (step S405).

Based on the response indicating "available", the execution determining unit 23 of the Websys 17₁ determines that the DESS 17₂ and the NCS 17₃ support the newly-introduced application function (step S406).

Next, the support level query unit 24 of the Websys 17₁ queries the DESS 17₂ about which function levels of the newly-introduced application function are supported by the DESS 17₂ (step S407).

When queried, the support level response unit 25 of the DESS 17₂ refers to the definition information 40D and obtains definition values "1" and "2" indicating function levels "setting SSL protocol" (level 1) and "setting encryption type" (level 2) that are supported (step S408). Then, the support level response unit 25 of the DESS $17_2$ sends a response including the definition values "1" and "2" indicating the supported function levels to the Websys $17_1$ (step S409).

When receiving the response, the execution determining unit 23 of the Websys $17_1$ determines that the function level "setting encryption type" (level 2) is the highest executable function level based on the definition values "1" and "2" in the response and the definition values "1" (level 1), "2" (level 2), and "3" (level 3) in the definition information 40D of its own (step S410). More specifically, the execution determining unit 23 compares the definition values in the response and the definition information 40D, identifies the highest common definition value ("2" in this example) based on the comparison results, and thereby determines that the function level "setting encryption type" (level 2) is the highest executable function level. Then, the execution determining unit 23 of the Websys $17_1$ reports the determined highest executable function level (level 2) to the DESS $17_2$ (step S411).

In response to the report, the execution determining unit 23 of the DESS $17_2$ sends an acknowledgement to the Websys 17 (step S412) and requests the function execution unit 30 to execute the basic function at the reported highest executable function level. Then, the function execution unit 30 of the DESS $17_2$ executes the basic function at the reported highest executable function level (level 2 that supports the function levels "setting SSL protocol" and "setting encryption type") (step S413).

When receiving the acknowledgement, the execution determining unit 23 of the Websys $17_1$ requests the functional execution unit 30 to execute the basic function at the determined execution level "2". In response, the function execution unit 30 of the Websys $17_1$ executes the basic function at the determined highest executable function level (step S414).

Thus, in the information processing apparatus 100 of this embodiment, even when there is a hierarchical relationship among the functional modules 17, the functional modules 17 query each other to confirm "function support status" (e.g., whether the functional modules 17 support newly-introduced application functions) and collaborate with each other to provide an application function.

<Summary>

In the information processing apparatus 100 of this embodiment, the functional modules 17 collaborate with each other as described below to provide an application function.

The function availability query unit 22 of the requester functional module 17a queries the provider functional module 17b about whether a requested provider function is available. When queried, the function availability response unit 21 of the provider functional module 17b sends a response indicating whether the requested provider function is available.

Based on the response, the execution determining unit 23 of the requester functional module 17a controls execution of the requester function (i.e., determines whether to execute an original version of the requester function or an updated version of the requester function).

With the information processing apparatus 100 configured as described above, even when one functional module 17 is changed, it is not necessary to change other functional modules 17, which collaborate with the changed functional module 17 to provide an application function, according to the change made to the changed functional module 17. Accordingly, the above embodiment makes it possible to prevent the work of software vendors from being complicated even when the number of combinations of the functional modules 17 increases. In other words, the above embodiment makes it possible to easily manage combinations of the functional modules 17.

The information processing functions of the above embodiment are implemented, for example, by executing a program(s), which is written in a programming language supported by the operating environment (platform) of the information processing apparatus 100, using a processing unit (e.g., the CPU 106) of the information processing apparatus 100.

Such a program may be stored in a non-transitory computer-readable storage medium (e.g., the storage medium 103a) such as a floppy (flexible) disk (FD), a compact disk (CD), a digital versatile disk (DVD), a secure digital (SD) memory card, and a universal serial bus (USB) memory. For example, the program stored in the storage medium 103a may be installed in the information processing apparatus 100 via the drive unit 103. Alternatively, the program may be installed via a telecommunication line and the interface unit 107 into the information processing apparatus 100.

In the above embodiment, the functional module 17 includes the definition information 40D. For example, the definition information 40D may be included in the functional module 17 when the functional module 17 is generated (or compiled) by referring to definition values written in a header file as program code (e.g., as "Define values").

An aspect of this disclosure provides an information processing apparatus, an information processing method, and a non-transitory storage medium storing program code for causing a computer to perform the information processing method that make it possible to easily manage combinations of functional modules.

The present invention is not limited to the specifically disclosed embodiments, and variations and modifications may be made without departing from the scope of the present invention.

What is claimed is:

1. An information processing apparatus, comprising:
   a storage that stores a plurality of modules constituting an application; and
   a processor that causes the modules stored in the storage to collaborate with each other to execute the application, wherein
   a first module of the modules queries a second module of the modules about whether the second module can use a function of the application;
   in response to the query, the second module sends, to the first module, a response indicating whether the second module can use the function of the application;
   when the response indicates that the second module cannot use the function of the application, the processor executes the application by causing the first module and the second module to collaborate with each other without using the function of the application; and
   when the response indicates that the second module can use the function of the application, the processor executes the application by causing the first module and the second module to collaborate with each other using the function of the application.

2. The information processing apparatus as claimed in claim 1, wherein
   the first module queries the second module about a function level of the function of the application;
   the second module sends a response indicating the function level of the function of the application; and the processor executes the application based on the response indicating the function level of the function of the application.

3. The information processing apparatus as claimed in claim 2, wherein the first module queries the second module about the function level of the function of the application only when the response indicates that the second module can use the function of the application.

4. The information processing apparatus as claimed in claim 2, wherein
- each of the modules includes definition information including definition values that are used among the modules to indicate supported function levels of the function of the application; and
- the second module sends the definition information to the first module as the response indicating the function level of the function of the application.

5. The information processing apparatus as claimed in claim 4, wherein the processor
- compares the definition values in the definition information of the first module with the definition values in the definition information sent as the response from the second module,
- determines a highest common definition value that is a highest one of the definition values existing in both sets of the definition information, and
- executes the application at the function level of the function of the application corresponding to the highest common definition value.

6. A method performed by an information processing apparatus,
- the information processing apparatus including
  - a storage that stores a plurality of modules including a first module and a second module constituting an application, and
  - a processor that causes the modules stored in the storage to collaborate with each other to execute the application
- the method comprising:
  - querying the second module of the modules, by the first module of the modules, about whether the second module can use a function of the application;
  - sending, by the second module, a response indicating whether the second module can use the function of the application;
  - when the response indicates that the second module cannot use the function of the application, executing, by the processor, the application by causing the first module and the second module to collaborate with each other without using the function of the application; and
  - when the response indicates that the second module can use the function of the application, executing, by the processor, the application by causing the first module and the second module to collaborate with each other using the function of the application.

7. A non-transitory computer-readable storage medium storing program code for causing an information processing apparatus to perform a method,
- the information processing apparatus including
  - a storage that stores a plurality of modules including a first module and a second module constituting an application, and
  - a processor that causes the modules stored in the storage to collaborate with each other to execute the application
- the method comprising:
  - querying the second module of the modules, by the first module of the modules, about whether the second module can use a function of the application;
  - sending, by the second module, a response indicating whether the second module can use the function of the application;
  - when the response indicates that the second module cannot use the function of the application, executing, by the processor, the application by causing the first module and the second module to collaborate with each other without using the function of the application; and
  - when the response indicates that the second module can use the function of the application, executing, by the processor, the application by causing the first module and the second module to collaborate with each other using the function of the application.

* * * * *